United States Patent Office 2,966,503
Patented Dec. 27, 1960

2,966,503

3-UNSUBSTITUTED-19-NOR-STEROID COMPOUNDS

Stefan Antoni Szpilfogel, Oss, Netherlands, assignor to Organon Inc., Orange, N.J., a corporation of New Jersey No Drawing. Filed Mar. 26, 1958, Ser. No. 723,974

Claims priority, application Netherlands Apr. 10, 1957

9 Claims. (Cl. 260—397.5)

The invention relates to new biologically active 19-nor-steroid compounds, hereinafter indicated by estrane compounds, which are not oxygenated in 3-position and which, in 17-position, contain an unsaturated lower aliphatic hydrocarbon rest in addition to a free or functionally converted hydroxyl group.

More particularly it relates to novel steroid compounds selected from the group consisting of estrane, $\Delta^4$-estrene, $\Delta^{5(10)}$-estrene and $\Delta^{3,5}$-estradiene, which compounds are substituted in 17-position by the groups $\alpha(R)$ and $\beta(OR_1)$, in which R is an unsaturated aliphatic hydrocarbon radical containing 2–6 carbon atoms and $R_1$ is selected from the group consisting of hydrogen and an acyl group containing 1–10 carbon atoms. These novel compounds possess anabolic, androgenic and progestative properties.

These novel compounds also exert strongly gonad-inhibiting effects.

The process according to the invention is characterized in that a 17-oxo steroid compound belonging to the group of $\Delta^{3,5}$-estradiene, $\Delta^4$-estrene, $\Delta^{5(10)}$-estrene, and estrane compounds which are not oxygenated in 3-position, is converted, by an addition reaction, into the corresponding 17-hydroxy compound, which, in 17-position, is also substituted by an alkynyl or alkenyl radical, or, if desired, the 17-alkenyl compound is prepared by partial reduction of the 17-alkynyl compound corresponding with it, after which, if desired, the thus prepared 17-hydroxy compound, which, in 17-position, is substituted by an alkynyl or alkenyl radical, is esterified at the 17-hydroxyl group.

The compounds to be applied as starting products in the present process, can be prepared by reacting $\Delta^{1,3,5}$-3-alkoxy-17-hydroxy-estratriene with an alkalimetal in the presence of liquid ammonia or in the presence of an aliphatic primary amine and oxidizing the resulting $\Delta^4$-17-hydroxy-estrene, $\Delta^{5(10)}$-17-hydroxy-estrene and $\Delta^{3,5}$-17-hydroxy-estradiene to the corresponding 17-oxo-compounds.

The 17-oxo-estrane can be prepared by reducing the above-mentioned unsaturated 17-hydroxy-estrane compounds with hydrogen and oxidizing the resulting saturated 17-hydroxy-estrane compound to the corresponding 17-oxo-compound.

The preparation of the 17- alkynyl or alkenyl compounds takes place by addition of a metallic derivative of an unsaturated hydrocarbon with a triple or double bond to the 17-oxo group of the starting material. The metallic derivative may be a magnesium halogenide of the said unsaturated hydrocarbons.

The preparation of the 17-alkynyl-compounds may also take place by addition reaction between the 17-oxo steroid compound and a triple unsaturated hydrocarbon in the presence of an alkali metal or an alkali metal compound, such as an alkali metal amide, alkali metal alcoholate, and the like, or by addition of a metal compound of a triple unsaturated hydrocarbon to the 17-oxo-group of the starting substance. The metal compound may be an alkali metal or alkaline earth metal compound, such as the lithium, sodium, or calcium compounds.

The unsaturated hydrocarbon with a triple or double bond is an alkyne or alkene with 2–6 C-atoms, e.g. ethyne, propyne, butyne, ethene, propene, butene, hexene or hexyne.

The desired 17-hydroxy-17-alkynyl- or alkenyl compound can be obtained from the reaction mixture, after hydrolysis, according to a method known per se, such as crystallization or chromatography.

It is also possible to prepare the 17-hydroxy-17-alkenyl-compound by reduction of the corresponding 17-alkynyl compound.

This reduction is usually carried out by means of hydrogen in the presence of a catalyst, e.g. nickel, palladium-calcium-sulphate, palladium-bariumsulphate, and the like.

After the reaction is completed, i.e. after 1 mol of $H_2$ has been taken up per 1 mol of starting substance, the resulting 17-hydroxy-17-alkenyl-compound can be isolated from the reaction mixture in a commonly used manner.

The resulting 17-hydroxy-compounds, substituted in 17-position by an alkynyl or alkenyl radical can be esterified, if desired, at the 17-hydroxy group with an aliphatic, aromatic or araliphatic carboxylic acid, e.g. acetic acid, propionic acid, butyric acid, valeric acid, capronic acid, isocapronic acid, succinic acid, tartaric acid, cyclopentyl acetic acid, $\beta$-cyclopentylpropionic acid, cyclohexyl acetic acid, $\gamma$-cyclohexyl butyric acid, phenyl acetic acid, $\beta$-phenyl propionic acid, benzoic acid, glycine and phenylalanine.

*Example 1*

To 145 ml. of dry methylamine which is cooled to $-20°$ C. 1.5 g. of lithium cut to small pieces are added. To the solution which is blue in colour after 10–20 minutes, a solution of 3.0 g. of estradiol-3-methylether in 145 ml. of absolute ether is added dropwise. Subsequently the reaction mixture is stirred at $-10°$ C. for 40 hours, after which 50 ml. of absolute ethanol are added. Then the methylamine is distilled off at low pressure. To the remaining solution 50 ml. of ether and 50 ml. of water are added. The water layer is separated and extracted with ether. The ethereal layer is washed with a 2 N hydrochloric acid solution, subsequently with a saturated sodium bicarbonate solution, and then with water. The ethereal solution is dried and evaporated to dryness. The resulting crude reaction product is dissolved in a mixture of benzene and petroleum ether (1:5) and chromatographed over aluminium oxide. The $\Delta^4$-17$\beta$-hydroxy-estrene obtained after chromatographic purification has a melting point of 80–90° C. and 95–100° C. after repeated crystallization from petroleum ether.

A solution of 13.2 g. of chromium trioxide in a mixture of 120 ml. of water and 20 ml. of acetic acid is added, with stirring, to a solution of 20 g. of $\Delta^4$-17$\beta$-hydroxy-estrene in 400 ml. of benzene. Subsequently the reaction mixture is vigorously stirred at room temperature for 16 hours, after which the benzene layer is separated. The remaining aqueous layer is extracted a few times with benzene and the collected benzene extracts are then added to the separated benzene layer. The collected benzene extracts are successively washed with dilute sulphuric acid and water and then evaporated to dryness. The residue is crystallized from acetone, and the $\Delta^4$-17-oxo-estrene of melting point 114–116° C. is obtained.

The infrared spectrum of this compound shows absorption bands at $5.75\mu$; $5.99\mu$; $12.38\mu$; $14.82\mu$ (dissolved in $CS_2$).

Example II

To a solution of potassium-t-butylate, prepared by adding 8.3 g. of potassium to 125 ml. of absolute t-butanol, 50 ml. of dioxane are added. This solution is cooled to 0° C., after which, in nitrogen atmosphere and with stirring, a solution of 5 g. of $\Delta^4$-17-oxo-estrene in 125 ml. of dioxane is added. The nitrogen stream is subsequently replaced by an acetylene stream. After acetylene gas has been led through the solution at 0° C. for 2 hours, the reaction mixture is poured on 1,750 ml. of water, containing 10 ml. of concentrated sulphuric acid. The resulting solution is extracted with ether. The separated ether layer is then washed successively with a sodium carbonate solution, dilute sulphuric acid, and with water. The ethereal layer is subsequently dried on sodium sulphate and then evaporated to dryness. The residue is crystallized from acetone, and the $\Delta^4$-17$\beta$-hydroxy-17$\alpha$-ethynyl-estrene of melting-point 157–161° C is obtained. The infrared spectrum of this compound shows absorption bands at 2.82$\mu$; 3.07$\mu$; 6.02$\mu$; 12.39$\mu$ and 14.87$\mu$ (in $CS_2$).

The $\Delta^4$-17$\beta$-hydroxy-17$\alpha$-ethynyl-estrene has also been obtained by reaction of acetylene magnesium bromide (prepared by leading acetylene through a solution of methyl magnesium bromide) with the $\Delta^4$-17-oxo-estrene.

In an analogous manner the $\Delta^4$-17$\beta$-hydroxy-17$\alpha$-hexynyl-estrene has been prepared by replacing acetylene magnesium bromide by hexynyl magnesium bromide.

Example III 100 g. of a Pd-BaSO$_4$ (5%) catalyst are added to a solution of 0.8 g. of $\Delta^4$-17$\beta$-hydroxy-17$\alpha$-ethynyl-estrene in 60 ml. of ethanol. This solution is shaken in a hydrogen atmosphere, until 0.003 mol of hydrogen has been taken up. The catalyst is subsequently filtered off and the filtrate is evaporated to dryness in vacuo. The residue is crystallized from acetonitrile, and the $\Delta^4$-17$\beta$-hydroxy-17$\alpha$-vinyl-estrene of melting-point 78–79° C. is obtained. The infrared spectrum of this compound shows absorption bands at 2.82$\mu$ (OH-group); 6.12$\mu$; 10.9$\mu$ (vinyl group) and 6.02$\mu$; 12.38$\mu$ and 14.82$\mu$ ($\Delta^4$ bond).

Example IV

A solution of 1 g. of $\Delta^4$-17$\beta$-hydroxy-17$\alpha$-ethynyl-estrene (prepared according to Example II), 5 ml. of pyridine and 4 ml. of acetic acid anhydride is heated at 100° C. for 1 hour. The solution is then evaporated to dryness in vacuo, after which the residue is taken up in a mixture of acetone and petroleum ether. By crystallization the $\Delta^4$-17$\beta$-acetoxy-17$\alpha$-ethynyl-estrene is obtained herefrom. The melting-point is 158–161° C. (from acetone).

Reduction of this compound in an analogous manner as described in Example III yields the $\Delta^4$-17$\beta$-acetoxy 17$\alpha$-vinyl-estrene.

By replacing the acetic acid anhydride by succinic acid anhydride or $\beta$-phenylpropionic acid anhydride the corresponding esters of the said compounds have been obtained.

Example V

A solution of 28 g. of pentenyl bromide in 85 ml. of ether is added to a mixture of 3.5 g. of magnesium and 200 ml. of ether. This mixture is stirred for 30 minutes, after which a solution of 4 g. of $\Delta^4$-17-oxo-estrene in 150 ml. of ether is added. Then the reaction mixture is refluxed for 2 hours. Subsequently 50 ml. of water which contains 20 ml. of concentrated hydrochloric acid are added to the mixture, after which the latter is stirred vigorously. Then the ether layer is separated, dried over sodium sulphate and finally evaporated to dryness. By recrystallization of the residue from a mixture of ethyl acetate and petroleum ether, the $\Delta^4$-17$\beta$-hydroxy-17$\alpha$-pentenyl-estrene is obtained. The infrared spectrum of this compound shows absorption bands at 2.82$\mu$, 6.02$\mu$, 12.39$\mu$, and 14.80$\mu$.

A solution of 1 g. of this compound in 4 g. of propionic anhydride and 4 g. of pyridine is heated in nitrogen atmosphere at a temperature of 100° C. for one hour and then poured into ice-water. The formed precipitate is filtered and then recrystallized from petroleum ether, giving the $\Delta^4$-17$\beta$-propionoxy-17$\alpha$-pentenyl-estrene.

By replacing the propionic anhydride by capronic anhydride, succinic anhydride, cyclopentylpropionic anhydride, or $\beta$-phenylpropionic anhydride, the corresponding $\Delta^4$-17$\beta$-acyloxy-17$\alpha$-pentenyl-estrene esters have been prepared.

Of the $\Delta^4$-17$\beta$-hydroxy-17$\alpha$-hexynyl-19-estrene, the 17-esters derived from acetic acid, trimethyl acetic acid, and phenylacetic acid have been prepared in an analogous manner.

Example VI

To a mixture of 22.4 ml. of absolute ether and 1.84 g. of magnesium, a mixture of 2.72 ml. of allylbromide and 2.72 ml. of absolute ether is added in nitrogen atmosphere.

Subsequently a solution of 2 g. of $\Delta^4$-17-oxo-estrene in 30 ml. of absolute ether is added to this reaction mixture, after which the whole is stirred for 4 hours. Then the reaction mixture is poured into acidified ice-water. The aqueuos mixture is extracted with ether; the ether layer is separated, washed with water, dried over sodium sulphate and evaporated to dryness. The residue is recrystallized from a mixture of ether and petrolum ether, giving the $\Delta^4$-17$\beta$-hydroxy-17$\alpha$-allyl-estrene of M.P. 79.5–80° C.; $(\alpha)_D = +39°$ (in chloroform). Infrared spectrum shows bands at 2.82$\mu$, 6.02$\mu$, 6.11$\mu$, 10.89$\mu$, 12.38$\mu$ and 14.80$\mu$.

Esterification of this compound according to the method described in Example IV, yielded the 17-esters thereof, derived from acetic acid, butyric acid, $\gamma$-cyclohexylbutyric acid, and $\beta$-phenylpropionic acid.

Example VII

To a solution of 1.85 g. of estradiol-3-methylether in 85 ml. of ether are added 50 ml. of liquid ammonia and 1.3 g. of lithium cut to small pieces. The mixture is stirred at the boiling point of ammonia for 15 minutes, after which absolute ethanol is added dropwise until the blue colour of the reaction mixture has just disappeared. Then again 1.3 g. of lithium are added and subsequently, after stirring for 15 minutes, 25 ml. of absolute ethanol. After evaporating the ammonia, the remaining ethereal solution is washed with water, dried over sodium sulphate, and then evaporated to dryness. Subsequently the residue is dissolved in benzene-petroleum ether (1:1) and chromatographed over a column prepared with 100 g. of aluminium oxide.

From the benzene-petroleum ether eluates the $\Delta^{3,5}$-17$\beta$-hydroxy-estradiene melting at 112–113° C. is obtained. The infrared spectrum of this compound shows characteristic bands at 11.88, 12.38 and 12.69$\mu$. The U.V.-spectrum has maxima at 228 m$\mu$ and 235 m$\mu$.

1 g. $\Delta^{3,5}$-17$\beta$-hydroxy-estradiene is dissolved in 22 ml. of glacial acetic acid. At room temperature a solution of 800 mg. of chromium trioxide in 2 ml. of water and 8 ml. of glacial acetic acid is added. The reaction mixture is left to stand at room temperature for 5 hours, after which it is diluted with 400 ml. of water and extracted with chloroform. The chloroform extracts are successively washed with a dilute sulphuric acid solution, a sodium carbonate solution, and water and then dried over sodium sulphate. The solution is evaporated to dryness. Crystallization from acetone-petroleum ether yields the $\Delta^{3,5}$-17-oxo-estradiene, which shows in the infrared spectrum bands at 5.75$\mu$, 11.88$\mu$, 12.38$\mu$, and 12.69$\mu$. The U.V. spectrum shows the maxima at 221m$\mu$ and 235m$\mu$.

Example VIII

Through a mixture of 6 g. of $\Delta^{3,5}$-17-oxo-estradiene, 300 g. of liquid ammonia, and 2 g. of sodium amide a stream of acetylene gas is led for 4 hours while stirring. Subsequently the mixture is treated with 5 g. of ammonium chloride, after which it is left to stand at 25° C. for 2 hours. Then the reaction mixture is poured into water, the aqueous mixture is extracted with ether, the ether layer is separated, washed with water, and then dried over sodium sulphate.

The ethereal solution is then evaporated to dryness. The residue is recrystallized from a mixture of acetone and petroleum ether, in which the $\Delta^{3,5}$-17$\beta$-hydroxyethinyl-estradiene is obtained. Infrared spectrum shows bands at 2.82$\mu$, 3.06$\mu$, 11.86$\mu$, 12.39$\mu$ and 12.69$\mu$. U.V. spectrum: maxima at 228 m$\mu$ and 235 m$\mu$.

According to the process described in Example III, this compound has been converted, by reduction, into the $\Delta^{3,5}$-17$\beta$-hydroxy-17$\alpha$-vinyl-estradiene.

Replacement of acetylene gas by propyne gas yielded, according to the process described in this example, the $\Delta^{3,5}$-17$\beta$-hydroxy-17$\alpha$-methylethynyl-estradiene.

Example IX

Of the $\Delta^{3,5}$-17$\beta$-hydroxy-17$\alpha$-ethynyl-estradiene and the $\Delta^{3,5}$-17$\beta$-hydroxy-17$\alpha$-vinyl-estradiene, the 17-esters have been prepared—in accordance with the process described in Example IV—derived from acetic acid, t-butylacetic acid, succinic acid, cyclopentylpropionic acid, and $\beta$-phenylpropionic acid.

Example X

In an analogous manner as described in Example V, 6-chlorohexene-1 is converted into the hexenyl magnesium bromide. To a solution of 40 g. of this compound in 200 ml. of ether is added a solution of 4.5 g. of $\Delta^{3,5}$-17-oxo-estradiene in 150 ml. of absolute ether. This mixture is further treated as described in Example V, after which the $\Delta^{3,5}$-17$\beta$-hydroxy-17$\alpha$-hexenyl-estradiene is obtained.

This compound has been converted—in accordance with the process described in Example IV—into 17-esters thereof derived from valeric acid, isocapronic acid, cyclohexylacetic acid, and benzoic acid.

Example XI 120 mg. of $\Delta^4$-17$\beta$-hydroxy-estrene prepared in Example I are dissolved in 10 ml. of glacial acetic acid and, after the addition of 10 mg. of a Pt-catalyst, shaken in a hydrogen atmosphere. After 45 minutes the reaction mixture does no longer take up any hydrogen. The catalyst is then filtered off and the filtrate is evaporated to dryness. From the residue the 17$\beta$-hydroxy-estrane is obtained by crystallization from acetone-ether with a melting point of 110°–113° C.

Oxidation of this compound according to the method described in Example I yields the 17-oxo-estrane with a melting point of 120–122° C. The IR-spectrum shows a band at 5.76$\mu$.

Example XII 50 ml. of dioxane are added to a solution of potassium-t-butylate, prepared by adding 8.3 g. of potassium to 125 ml. of absolute t-butanol. At 0° C. and in nitrogen atmosphere a solution of 5 g. of 17-oxo-estrane in 150 ml. of dioxane is added to this solution. Subsequently a current of acetylene gas is led through the solution at 0° C. for 2 hours, after which the mixture is poured into 2 l. of water containing 10 ml. of concentrated sulphuric acid. The aqueous mixture is subsequently processed as described in Example II, after which the 17$\beta$-hydroxy-17$\alpha$-ethynyl-estrane is obtained. Infrared spectrum shows bands at 2.81$\mu$ and 3.07$\mu$.

According to the process described in Example III and in the presence of a Pd-BaSO$_4$-catalyst, this compound has been converted into the 17$\beta$-hydroxy-17$\alpha$-vinyl-estrane by reduction with hydrogen.

The above described 17$\beta$-hydroxy-17$\alpha$-ethynyl-estrane has been converted—by esterification according to the process of Example IV—into the 17-esters derived from acetic acid, nonane-carboxylic acid, hexahydrobenzoic acid, and $\beta$-phenylpropionic acid.

Reduction of these compounds in an analogous manner as described in Example III yields the 17-acetate, 17-decanoate, 17-hexahydrobenzoate, and 17$\beta$-phenylpropionate of 17$\beta$-hydroxy-17$\alpha$-vinyl-estrane.

Example XIII

Analogous to the process described in Example V, the 17-oxo-estrane has been converted—by means of butenyl magnesium bromide, or propargyl magnesium bromide—into the 17$\beta$-hydroxy-17$\alpha$-butenyl-estrane, or 17$\beta$-hydroxy-17$\alpha$-propargyl-estrane.

By esterification of these compounds according to the process described in Example IV, the corresponding 17-esters have been obtained derived from propionic acid, cyclohexyl-acetic acid, and succinic acid.

Example XIV

To 145 ml. of dry methylamine which has been cooled to −20° C. are added 1.5 g. of lithium cut to small pieces. To this solution a solution of 3.0 g. of estradiol-3-methylether in 145 ml. of absolute ether is added dropwise. Subsequently the reaction mixture is stirred at a temperature of −10° C. for 40 hours, after which 50 ml. of absolute ethanol are added. Then the methylamine is distilled off at low pressure. To the remaining solution are added 50 ml. of ether and 50 ml. of water. The water layer is separated and extracted a few times with ether. The collected ether extracts are added to the ethereal layer, after which this ethereal solution is washed with a 2 N hydrochloric acid solution, subsequently with a saturated sodium carbonate solution, and then with water. The ethereal solution is dried over sodium sulphate and finally evaporated to dryness. The resulting crude reaction product is dissolved in a mixture of benzene and petroleum-ether (1:5) and chromatographed over a column prepared with 70 g. of aluminiumoxide. From the first fractions of the benzene-petroleum-ether eluates the $\Delta^{5(10)}$-17$\beta$-hydroxy-estrene is obtained with a melting point of 92–95° C.

1.0 g. of $\Delta^{5(10)}$-17$\beta$-hydroxy-estrene is dissolved in 100 ml. of acetone, after which 1.15 ml. of an 8 N chromium-trioxide solution is added to this solution at 10° C. and while stirring vigorously. The reaction mixture is shaken for 5 minutes and then poured into water. The aqueous mixture is extracted with chloroform, the chloroform layer is separated, washed with a dilute sodium bicarbonate solution, and subsequently with water till neutral reaction, then dried, and finally evaporated to dryness. The residue is filtered over a five-fold quantity of aluminiumoxide. By crystallization from petroleum-ether 0.7 g. of $\Delta^{5(10)}$-17-oxo-estrene is obtained with a melting point of 115–122° C.

Example XV

To a solution of 5.5 ml. of absolute isopropanol and 12 ml. of absolute benzene, 1.25 g. of potassium are added in nitrogen atmosphere. After 15 minutes the reaction mixture is cooled to 12° C., after which a current of purified acetylene gas is led through the solution for 3 hours.

Subsequently a solution of 1.9 g. of $\Delta^{5(10)}$-17-oxo-estrene in 8 ml. of benzene and 5 ml. of ether is added. Then a current of acetylene gas is led through the solution for 4 hours, after which the whole is stirred at room temperature for 14 hours. Then a mixture of 12 ml. of water and 1.5 ml. of concentrated sulphuric acid is added to the solution and the whole is stirred for 10 minutes. Then the reaction mixture is diluted with 100 ml. of water and washed with ether. The ether layer is separated, washed with water, dried on potassium sulphate, and then evaporated to dryness. The residue is recrystallized from a mixture of ether and petroleum ether to yield the Δ5(10)-17β-hydroxy-17α-ethynyl-estrene of melting-point 112–113° C. and (α)_D = +116° (in chloroform). Infrared spectrum shows bands at 2.81μ, and 3.07μ.

Reduction of this compound according to the process described in Example III yields the Δ5(10)-17β-hydroxy-17α-vinyl-estrene.

The above compounds have been converted by esterification according to the process described in Example IV—into the 17-esters thereof, derived from acetic acid, capronic acid, enanthic acid, succinic acid, cyclopentylpropionic acid, and β-phenylproprionic acid.

Example XVI

A solution of 1 g. of Δ5(10)-17-oxo-estrene in 50 ml. of absolute ether is slowly added to a solution of 6 g. of allyl magnesium bromide in 50 ml. of ether. The mixture is refluxed for 2 hours, then cooled and subsequently treated with a 10% solution of tartaric acid in water. The ether layer is separated, washed with water, dried on sodium sulphate, and then evaporated to dryness. The residue is recrystallized from a mixture of acetone and petroleum ether to yield the Δ5(10)-17β-hydroxy-17α-allyl-estrene. Infrared spectrum shows bands at 2.80μ, 6.11μ, 10.87μ.

By replacing the allyl magnesium bromide by butenyl magnesium bromide, or by hexynyl magnesium bromide, the Δ5(10)-17β-hydroxy-17α-butenylestrene, or the Δ5(10)-17β-hydroxy-17α-hexynyl-estrene is obtained.

The above compounds have been converted—according to the process described in Example IV—into the 17-esters derived from acetic acid, t-butyl acetic acid, succinic acid, and β-phenylpropionic acid.

I claim:

1. New steroid compounds selected from the group consisting of estrene, Δ4-estrene, Δ5(10)-estrene and Δ3,5-estradiene, which compounds are substituted in 17-position by the groups α(R) and β(OR₁), in which R is an unsaturated aliphatic hydrocarbon radical containing 2–6 carbon atoms and having one unsaturated bond, and R₁ is selected from the group consisting of hydrogen and an acyl group derived from a hydrocarbon carboxylic acid selected from the group consisting of aliphatic, aromatic and araliphatic carboxylic acids containing 1–10 carbon atoms.

2. Compounds of the formula:

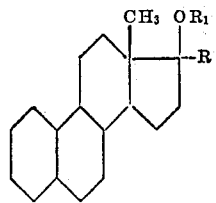

in which R is an unsaturated aliphatic hydrocarbon radical containing 2–6 carbon atoms and having one unsaturated bond, and R₁ is selected from the group consisting of hydrogen and an acyl group derived from a hydrocarbon carboxylic acid selected from the group consisting of aliphatic, aromatic and araliphatic carboxylic acids containing 1–10 carbon atoms.

3. Compounds of the formula:

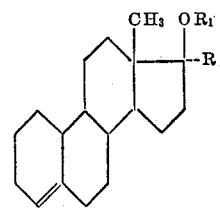

in which R is an unsaturated aliphatic hydrocarbon radical containing 2–6 carbon atoms and having one unsaturated bond, and R₁ is selected from the group consisting of hydrogen and an acyl group derived from a hydrocarbon carboxylic acid selected from the group consisting of aliphatic, aromatic and araliphatic carboxylic acids containing 1–10 carbon atoms.

4. Compounds of the formula:

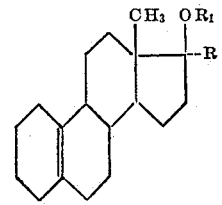

in which R is an unsaturated aliphatic hydrocarbon radical containing 2–6 carbon atoms and having one unsaturated bond, and R₁ is selected from the group consisting of hydrogen and an acyl group derived from a hydrocarbon carboxylic acid selected from the group consisting of aliphatic, aromatic and araliphatic carboxylic acids containing 1–10 carbon atoms.

5. Compounds of the formula:

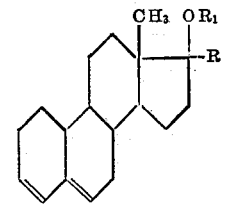

in which R is an unsaturated aliphatic hydrocarbon radical containing 2–6 carbon atoms and having one unsaturated bond, and R₁ is selected from the group consisting of hydrogen and an acyl group derived from a hydrocarbon carboxylic acid selected from the group consisting of aliphatic, aromatic and araliphatic carboxylic acids containing 1–10 carbon atoms.

6. Compounds of the formula:

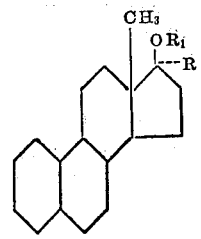

in which R is an unsaturated aliphatic hydrocarbon radical containing 2–6 carbon atoms and having one unsaturated bond and R₁ is hydrogen.

7. Compounds of the formula:

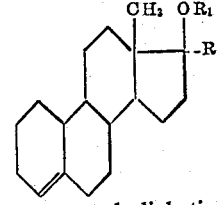

in which R is an unsaturated aliphatic hydrocarbon radical containing 2–6 carbon atoms and having one unsaturated bond and R₁ is hydrogen.

8. Compounds of the formula:

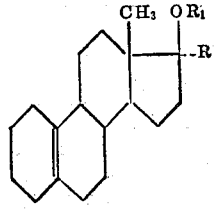

in which R is an unsaturated aliphatic hydrocarbon radical containing 2–6 carbon atoms and having one unsaturated bond and $R_1$ is hydrogen.

9. Compounds of the formula:

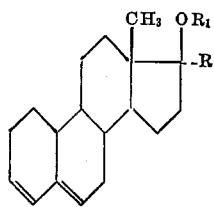

in which R is an unsaturated aliphatic hydrocarbon radical containing 2–6 carbon atoms and having one unsaturated bond, and $R_1$ is hydrogen.

References Cited in the file of this patent

UNITED STATES PATENTS

| 2,374,369 | Miescher et al. | Apr. 24, 1945 |
| 2,744,122 | Djerassi et al. | May 1, 1956 |
| 2,881,188 | Babcock et al. | Apr. 7, 1959 |

OTHER REFERENCES

Djerassi et al.: J. Am. Chem. Soc., vol. 72 (December 1950), pages 5750 and 5751.

UNITED STATES PATENT OFFICE
CERTIFICATION OF CORRECTION

Patent No. 2,966,503 December 27, 1960

Stefan Antoni Szpilfogel

It is hereby certified that error appears in the above numbered patent requiring correction and that the said Letters Patent should read as corrected below.

Column 5, line 14, after "-hydroxy-" insert -- 17α- --; column 7, line 37, for "estrene", first occurrence, read -- estrane --.

Signed and sealed this 6th day of June 1961.

(SEAL)
Attest:

ERNEST W. SWIDER
Attesting Officer

DAVID L. LADD
Commissioner of Patents